(12) United States Patent
Fitton et al.

(10) Patent No.: US 8,783,663 B2
(45) Date of Patent: *Jul. 22, 2014

(54) HUMIDIFYING APPARATUS

(71) Applicant: Dyson Technology Limited, Wiltshire (GB)

(72) Inventors: Nicholas Gerald Fitton, Malmesbury (GB); John Scott Sutton, Malmesbury (GB); Peter David Gammack, Malmesbury (GB); James Dyson, Malmesbury, GA (US)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,693

(22) Filed: Dec. 18, 2012

(65) Prior Publication Data

US 2013/0161842 A1    Jun. 27, 2013

Related U.S. Application Data

(63) Continuation of application No. 12/716,707, filed on Mar. 3, 2010, now Pat. No. 3,356,804.

(30) Foreign Application Priority Data

Mar. 4, 2009 (GB) .................................. 0903690.6
Aug. 28, 2009 (GB) .................................. 0915033.5

(51) Int. Cl.
    *B01F 3/04*          (2006.01)
    *F24F 1/01*           (2011.01)
    *F24F 6/14*           (2006.01)
    *F24F 13/26*         (2006.01)

(52) U.S. Cl.
CPC ... *F24F 1/01* (2013.01); *F24F 6/14* (2013.01); *F24F 13/26* (2013.01); *F24F 2221/28* (2013.01)
USPC .......... 261/28; 261/116; 415/207; 415/211.2; 417/313

(58) Field of Classification Search
CPC ............... F24F 1/01; F24F 6/14; F24F 13/26; F24F 2006/14; F24F 2221/28; F04F 5/16; Y02B 30/545
USPC ............. 261/28, 30, 81, 116; 415/207, 211.2, 415/220; 417/110, 126, 313
See application file for complete search history.

(56) References Cited

U.S. PATENT DOCUMENTS 284,962 A     9/1883    Huston
1,357,261 A    11/1920   Svoboda
(Continued)

FOREIGN PATENT DOCUMENTS

BE            560119       8/1957
CA           1055344      5/1979
(Continued)

OTHER PUBLICATIONS

Gammack et al., U.S. Office Action mailed Sep. 6, 2013, directed to U.S. Appl. No. 12/716,740; 15 pages.

(Continued)

*Primary Examiner* — Charles Bushey
(74) *Attorney, Agent, or Firm* — Morrison & Foerster LLP

(57) ABSTRACT

Humidifying apparatus includes a humidifier for emitting moist air into an external environment, and a fan assembly for generating an air current within the external environment for conveying the emitted moist air away from the humidifier. The fan assembly includes a device for creating an air flow and a nozzle including an interior passage for receiving the air flow and a mouth for emitting the air flow. The humidifier is located behind nozzle, the nozzle extending about and defining an opening through which both air from outside the nozzle and the moist air emitted from the humidifier are drawn by the air flow emitted from the mouth.

28 Claims, 10 Drawing Sheets

(56) References Cited

U.S. PATENT DOCUMENTS

Figure 1:
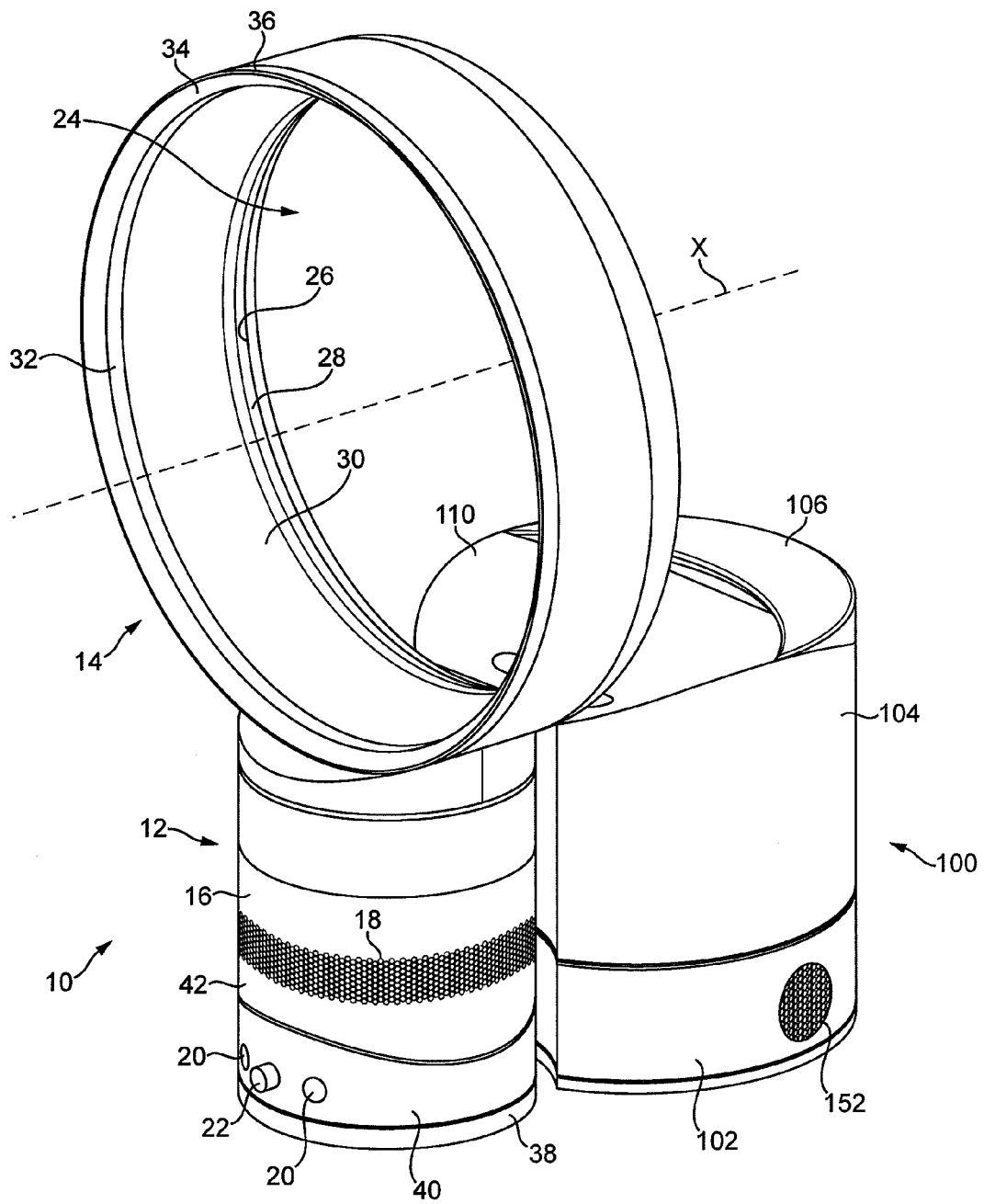

| | | |
|---|---|---|
| 1,767,060 A | 6/1930 | Ferguson |
| 1,896,869 A | 2/1933 | Larsh |
| 2,014,185 A | 9/1935 | Martin |
| 2,035,733 A | 3/1936 | Wall |
| 2,071,266 A | 2/1937 | Schmidt |
| D103,476 S | 3/1937 | Weber |
| 2,115,883 A | 5/1938 | Sher |
| D115,344 S | 6/1939 | Chapman |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,729,934 A | 5/1973 | Denning et al. |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,090,814 A | 5/1978 | Teodorescu et al. |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,541 A | 1/1980 | Beck et al. |
| 4,192,461 A | 3/1980 | Arborg |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,568,243 A | 2/1986 | Schubert et al. |
| 4,630,475 A | 12/1986 | Mizoguchi |
| 4,643,351 A | 2/1987 | Fukamachi et al. |
| 4,703,152 A | 10/1987 | Shih-Chin |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,110,266 A | 5/1992 | Toyoshima et al. |
| 5,168,722 A | 12/1992 | Brock |
| 5,176,856 A | 1/1993 | Takahashi et al. |
| 5,188,508 A | 2/1993 | Scott et al. |
| 5,296,769 A | 3/1994 | Havens et al. |
| 5,310,313 A | 5/1994 | Chen |
| 5,317,815 A | 6/1994 | Hwang |
| 5,338,495 A | 8/1994 | Steiner et al. |
| 5,402,938 A | 4/1995 | Sweeney |
| 5,407,324 A | 4/1995 | Starnes, Jr. et al. |
| 5,425,902 A | 6/1995 | Miller et al. |
| 5,435,489 A | 7/1995 | Jenkins et al. |
| 5,483,616 A | 1/1996 | Chiu et al. |
| 5,518,370 A | 5/1996 | Wang et al. |
| 5,609,473 A | 3/1997 | Litvin |
| 5,645,769 A | 7/1997 | Tamaru et al. |
| 5,649,370 A | 7/1997 | Russo |
| 5,671,321 A | 9/1997 | Bagnuolo |
| 5,677,982 A | 10/1997 | Levine et al. |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| D398,983 S | 9/1998 | Keller et al. |
| 5,841,080 A | 11/1998 | Iida et al. |
| 5,843,344 A | 12/1998 | Junkel et al. |
| 5,859,952 A | 1/1999 | Levine et al. |
| 5,862,037 A | 1/1999 | Behl |
| 5,868,197 A | 2/1999 | Potier |
| 5,881,685 A | 3/1999 | Foss et al. |
| D415,271 S | 10/1999 | Feer |
| 6,015,274 A | 1/2000 | Bias et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,480,672 B1 | 11/2002 | Rosenzweig et al. |
| 6,599,088 B2 | 7/2003 | Stagg |
| 6,604,694 B1 | 8/2003 | Kordas et al. |
| D485,895 S | 1/2004 | Melwani |
| 6,789,787 B2 | 9/2004 | Stutts |
| 6,791,056 B2 | 9/2004 | VanOtteren et al. |
| 6,830,433 B2 | 12/2004 | Birdsell et al. |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,192,258 B2 | 3/2007 | Kuo et al. |
| 7,412,781 B2 | 8/2008 | Mattinger et al. |
| 7,478,993 B2 | 1/2009 | Hong et al. |
| 7,540,474 B1 | 6/2009 | Huang et al. |
| D598,532 S | 8/2009 | Dyson et al. |
| D602,143 S | 10/2009 | Gammack et al. |
| D602,144 S | 10/2009 | Dyson et al. |
| D605,748 S | 12/2009 | Gammack et al. |
| 7,660,110 B2 | 2/2010 | Vinson et al. |
| 7,664,377 B2 | 2/2010 | Liao |
| D614,280 S | 4/2010 | Dyson et al. |
| 7,731,050 B2 | 6/2010 | Parks et al. |
| 7,775,848 B1 | 8/2010 | Auerbach |
| 7,806,388 B2 | 10/2010 | Junkel et al. |
| 7,841,045 B2 | 11/2010 | Shaanan et al. |
| 8,002,520 B2 | 8/2011 | Dawson et al. |
| 8,092,166 B2 | 1/2012 | Nicolas et al. |
| 8,113,490 B2 * | 2/2012 | Chen ............................ 261/81 |
| 8,152,495 B2 | 4/2012 | Boggess, Jr. et al. |
| 8,246,317 B2 | 8/2012 | Gammack |
| 8,356,804 B2 * | 1/2013 | Fitton et al. ................. 261/28 |
| 8,544,826 B2 * | 10/2013 | Ediger et al. ................. 261/30 |
| 2002/0106547 A1 | 8/2002 | Sugawara et al. |
| 2003/0059307 A1 | 3/2003 | Moreno et al. |
| 2003/0164367 A1 | 9/2003 | Bucher et al. |
| 2003/0171093 A1 | 9/2003 | Gumucio Del Pozo |
| 2003/0190183 A1 | 10/2003 | Hsing |

(56) References Cited

U.S. PATENT DOCUMENTS

| | | |
|---|---|---|
| 2004/0022631 A1 | 2/2004 | Birdsell et al. |
| 2004/0049842 A1 | 3/2004 | Prehodka |
| 2004/0106370 A1 | 6/2004 | Honda et al. |
| 2004/0149881 A1 | 8/2004 | Allen |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0163670 A1 | 7/2005 | Alleyne et al. |
| 2005/0173997 A1 | 8/2005 | Schmid et al. |
| 2005/0281672 A1 | 12/2005 | Parker et al. |
| 2006/0172682 A1 | 8/2006 | Orr et al. |
| 2006/0199515 A1 | 9/2006 | Lasko et al. |
| 2006/0263073 A1 | 11/2006 | Clarke et al. |
| 2006/0279927 A1 | 12/2006 | Strohm |
| 2007/0035189 A1 | 2/2007 | Matsumoto |
| 2007/0041857 A1 | 2/2007 | Fleig |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0237500 A1 | 10/2007 | Wang |
| 2007/0269323 A1 | 11/2007 | Zhou et al. |
| 2008/0020698 A1 | 1/2008 | Spaggiari |
| 2008/0124060 A1 | 5/2008 | Gao |
| 2008/0152482 A1 | 6/2008 | Patel |
| 2008/0166224 A1 | 7/2008 | Giffin |
| 2008/0286130 A1 | 11/2008 | Purvines |
| 2008/0314250 A1 | 12/2008 | Cowie et al. |
| 2009/0026850 A1 | 1/2009 | Fu |
| 2009/0032130 A1 | 2/2009 | Dumas et al. |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0120925 A1 | 5/2009 | Lasko |
| 2009/0191054 A1 | 7/2009 | Winkler |
| 2009/0214341 A1 | 8/2009 | Craig |
| 2010/0133707 A1 | 6/2010 | Huang |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0225012 A1 | 9/2010 | Fitton et al. |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226752 A1 | 9/2010 | Gammack et al. |
| 2010/0226753 A1 | 9/2010 | Dyson et al. |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1 | 9/2010 | Fitton et al. |
| 2010/0226801 A1 | 9/2010 | Gammack |
| 2010/0254800 A1 | 10/2010 | Fitton et al. |
| 2011/0058935 A1 | 3/2011 | Gammack et al. |
| 2011/0110805 A1 | 5/2011 | Gammack et al. |
| 2011/0164959 A1 | 7/2011 | Fitton et al. |
| 2011/0223014 A1 | 9/2011 | Crawford et al. |
| 2011/0223015 A1 | 9/2011 | Gammack et al. |
| 2012/0031509 A1 | 2/2012 | Wallace et al. |
| 2012/0033952 A1 | 2/2012 | Wallace et al. |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0057959 A1 | 3/2012 | Hodgson et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0114513 A1 | 5/2012 | Simmonds et al. |
| 2012/0230658 A1 | 9/2012 | Fitton et al. |
| 2012/0308375 A1 | 12/2012 | Gammack |
| 2013/0026664 A1 | 1/2013 | Staniforth et al. |
| 2013/0028763 A1 | 1/2013 | Staniforth et al. |
| 2013/0028766 A1 | 1/2013 | Staniforth et al. |
| 2013/0129490 A1 | 5/2013 | Dos Reis et al. |
| 2013/0199372 A1 | 8/2013 | Nock et al. |
| 2013/0234346 A1 | 9/2013 | Staniforth et al. |
| 2013/0234347 A1 | 9/2013 | Staniforth et al. |
| 2013/0249122 A1 | 9/2013 | Staniforth et al. |
| 2013/0249124 A1 | 9/2013 | Staniforth et al. |
| 2013/0249126 A1 | 9/2013 | Staniforth et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0323100 A1 | 12/2013 | Poulton et al. |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 2549372 | 5/2003 |
| CN | 1437300 | 8/2003 |
| CN | 2650005 | 10/2004 |
| CN | 2713643 | 7/2005 |
| CN | 1680727 | 10/2005 |
| CN | 2833197 | 11/2006 |
| CN | 201147215 | 11/2008 |
| CN | 201180678 | 1/2009 |
| CN | 201221477 | 4/2009 |
| CN | 101451754 A | 6/2009 |
| CN | 201281416 | 7/2009 |
| CN | 201349269 | 11/2009 |
| CN | 201486901 | 5/2010 |
| CN | 101749288 | 6/2010 |
| CN | 201502549 | 6/2010 |
| CN | 101825103 A | 9/2010 |
| CN | 201568337 | 9/2010 |
| CN | 101936310 | 1/2011 |
| CN | 201696365 U | 1/2011 |
| CN | 201696366 | 1/2011 |
| CN | 201739199 U | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201779080 | 3/2011 |
| CN | 201786778 | 4/2011 |
| CN | 201802648 | 4/2011 |
| CN | 102095236 | 6/2011 |
| CN | 201874901 U | 6/2011 |
| CN | 201917047 | 8/2011 |
| CN | 102251973 A | 11/2011 |
| CN | 102287357 | 12/2011 |
| CN | 102367813 | 3/2012 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 007 037 | 8/2010 |
| EP | 0 044 494 | 1/1982 |
| EP | 0186581 | 7/1986 |
| EP | 0 784 947 | 7/1997 |
| EP | 1 094 224 | 4/2001 |
| EP | 1 138 954 | 10/2001 |
| EP | 1357296 B1 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| FR | 1033034 | 7/1953 |
| FR | 1119439 | 6/1956 |

(56) References Cited

FOREIGN PATENT DOCUMENTS

| | | |
|---|---|---|
| FR | 1387334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 0/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 863 124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 A | 9/2010 |
| GB | 2468319 | 9/2010 |
| GB | 2468320 | 9/2010 |
| GB | 2468323 | 9/2010 |
| GB | 2468328 | 9/2010 |
| GB | 2468329 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2484695 A | 4/2012 |
| GB | 2493231 A | 1/2013 |
| GB | 2493505 A | 2/2013 |
| GB | 2493507 A | 2/2013 |
| JP | 31-13055 | 8/1956 |
| JP | 35-4369 | 3/1960 |
| JP | 39-7297 | 3/1964 |
| JP | 49-150403 | 12/1974 |
| JP | 51-7258 | 1/1976 |
| JP | 53-60100 | 5/1978 |
| JP | 56-167897 | 12/1981 |
| JP | 57-71000 | 5/1982 |
| JP | 57-157097 | 9/1982 |
| JP | 61-31830 | 2/1986 |
| JP | 61-116093 | 6/1986 |
| JP | 61-280787 | 12/1986 |
| JP | 62-223494 | 10/1987 |
| JP | 63-179198 | 7/1988 |
| JP | 63-306340 | 12/1988 |
| JP | 64-21300 | 2/1989 |
| JP | 64-83884 | 3/1989 |
| JP | 1-138399 | 5/1989 |
| JP | 1-224598 | 9/1989 |
| JP | 2-146294 | 6/1990 |
| JP | 2-218890 | 8/1990 |
| JP | 2-248690 | 10/1990 |
| JP | 3-52515 | 5/1991 |
| JP | 3-267598 | 11/1991 |
| JP | 4-43895 | 2/1992 |
| JP | 4-366330 | 12/1992 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-190443 | 7/1995 |
| JP | 8-21400 | 1/1996 |
| JP | 8-313019 | 11/1996 |
| JP | 9-100800 | 4/1997 |
| JP | 9-178083 | 7/1997 |
| JP | 9-287600 | 11/1997 |
| JP | 11-502586 | 3/1999 |
| JP | 11-227866 | 8/1999 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 3127331 | 11/2006 |
| JP | 2007-138763 | 6/2007 |
| JP | 2007-138789 | 6/2007 |
| JP | 2008-39316 | 2/2008 |
| JP | 2008-100204 | 5/2008 |
| JP | 3146538 | 10/2008 |
| JP | 2008-294243 | 12/2008 |
| JP | 2009-44568 | 2/2009 |
| JP | 2009-62986 | 3/2009 |
| JP | 2010-131259 | 6/2010 |
| JP | 2010-203764 | 9/2010 |
| JP | 2012-31806 | 2/2012 |
| KR | 1999-002660 | 1/1999 |
| KR | 10-2005-0102317 | 10/2005 |
| KR | 2007-0007997 | 1/2007 |
| KR | 20-0448319 | 3/2010 |
| KR | 10-2010-0055611 | 5/2010 |
| KR | 10-0985378 | 9/2010 |
| TW | 517825 | 1/2003 |
| TW | 589932 | 6/2004 |
| TW | M394383 | 12/2010 |
| TW | M399207 | 3/2011 |
| TW | M407299 | 7/2011 |
| WO | WO-90/13478 | 11/1990 |
| WO | WO-95/06822 | 3/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO 2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |

(56) References Cited

FOREIGN PATENT DOCUMENTS

| WO | WO-2008/024569 | | 2/2008 |
|---|---|---|---|
| WO | WO-2008/139491 | | 11/2008 |
| WO | WO-2009/030879 | | 3/2009 |
| WO | WO-2009/030881 | | 3/2009 |
| WO | WO-2010/100449 | | 9/2010 |
| WO | WO-2010/100451 | | 9/2010 |
| WO | WO-2010/100452 | | 9/2010 |
| WO | WO-2010/100453 | | 9/2010 |
| WO | WO-2010/100462 | | 9/2010 |
| WO | WO-2011/050041 | A1 | 4/2011 |
| WO | WO-2011/147318 | | 12/2011 |
| WO | WO-2012/006882 | A1 | 1/2012 |
| WO | WO-2012/033517 | A1 | 3/2012 |
| WO | WO-2013/014419 | A2 | 1/2013 |

OTHER PUBLICATIONS

Gammack et al., Office Action mailed Sep. 27, 2013, directed to U.S. Appl. No. 13/588,666; 10 pages.

Wallace et al., Office Action mailed Oct. 23, 2013, directed to U.S. Appl. No. 13/192,223; 18 pages.

Gammack et al., U.S. Office Action mailed Feb. 28, 2013, directed to U.S. Appl. No. 12/945,558; 16 pages.

Gammack et al., U.S. Office Action mailed Feb. 14, 2013, directed to U.S. Appl. No. 12/716,515; 21 pages.

Gammack et al., U.S. Office Action mailed Mar. 14, 2013, directed to U.S. Appl. No. 12/716,740; 15 pages.

Gammack, P. et al., Office Action mailed Aug. 19, 2013, directed to U.S. Appl. No. 12/716,515; 20 pages.

GB Search Report dated Jun. 5, 2009, directed to counterpart GB Application No. 0903690.6; 1 page.

GB Search Report dated Dec. 16, 2009, directed to counterpart GB Application No. 0915033.5; 2 pages.

International Search Report and Written Opinion mailed Aug. 11, 2010, directed to International Application No. PCT/GB2010/050283; 14 pages.

Gammack, P. et al., U.S. Office Action mailed Dec. 9, 2010, directed to U.S. Appl. No. 12/203,698; 10 pages.

Gammack, P. et al., U.S. Office Action mailed Jun. 21, 2011, directed to U.S. Appl. No. 12/203,698; 11 pages.

Gammack et al., Office Action mailed Sep. 17, 2012, directed to U.S. Appl. No. 13/114,707; 12 pages.

Gammack, P. et al., U.S. Office Action mailed Dec. 10, 2010, directed to U.S. Appl. No. 12/230,613; 12 pages.

Gammack, P. et al., U.S. Office Action mailed May 13, 2011, directed to U.S. Appl. No. 12/230,613; 13 pages.

Gammack, P. et al., U.S. Office Action mailed Sep. 7, 2011, directed to U.S. Appl. No. 12/230,613; 15 pages.

Gammack, P. et al., U.S. Office Action mailed Jun. 8, 2012, directed to U.S. Appl. No. 12/230,613; 15 pages.

Gammack et al., U.S. Office Action mailed Aug. 20, 2012, directed to U.S. Appl. No. 12/945,558; 15 pages.

Fitton et al., U.S. Office Action mailed Nov. 30, 2010 directed to U.S. Appl. No. 12/560,232; 9 pages.

Nicolas, F. et al., U.S. Office Action mailed Mar. 7, 2011, directed to U.S. Appl. No. 12/622,844; 10 pages.

Nicolas, F. et al., U.S. Office Action mailed Sep. 8, 2011, directed to U.S. Appl. No. 12/622,844; 11 pages.

Helps, D. F. et al., U.S. Office Action mailed Feb. 15, 2013, directed to U.S. Appl. No. 12/716,694; 12 pages.

Fitton, et al., U.S. Office Action mailed Mar. 8, 2011, directed to U.S. Appl. No. 12/716,780; 12 pages.

Fitton, et al., U.S. Office Action mailed Sep. 6, 2011, directed to U.S. Appl. No. 12/716,780; 16 pages.

Gammack, P. et al., U.S. Office Action mailed Dec. 9, 2010, directed to U.S. Appl. No. 12/716,781; 17 pages.

Gammack, P. et al., U.S. Final Office Action mailed Jun. 24, 2011, directed to U.S. Appl. No. 12/716,781; 19 pages.

Gammack, P. et al., U.S. Office Action mailed Apr. 12, 2011, directed to U.S. Appl. No. 12/716,749; 8 pages.

Gammack, P. et al., U.S. Office Action mailed Sep. 1, 2011, directed to U.S. Appl. No. 12/716,749; 9 pages.

Gammack, P. et al., U.S. Office Action mailed Jun. 25, 2012, directed to U.S. Appl. No. 12/716,749; 11 pages.

Fitton et al., U.S. Office Action mailed Mar. 30, 2012, directed to U.S. Appl. No. 12/716,707; 7 pages.

Gammack, P. et al., U.S. Office Action mailed May 24, 2011, directed to U.S. Appl. No. 12/716,613; 9 pages.

Gammack, P. et al. U.S. Office Action mailed Oct. 18, 2012, directed to U.S. Appl. No. 12/917,247; 11 pages.

Reba, I. (1966). "Applications of the Coanda Effect," *Scientific American* 214:84-92.

Third Party Submission Under 37 CFR 1.99 filed Jun. 2, 2011, directed towards U.S. Appl. No. 12/203,698; 3 pages.

Gammack et al., Office Action mailed Jun. 12, 2013, directed towards U.S. Appl. No. 12/945,558; 20 pages.

Gammack et al., Office Action mailed May 29, 2013, directed towards U.S. Appl. No. 13/588,666; 11 pages.

Wallace et al., Office Action mailed Jun. 7, 2013, directed towards U.S. Appl. No. 13/192,223; 30 pages.

Gammack, P. et al., U.S. Office Action mailed Feb. 10, 2014, directed to U.S. Appl. No. 12/716,515; 21 pages.

\* cited by examiner

HUMIDIFYING APPARATUS

REFERENCE TO RELATED APPLICATIONS

This application is a continuation of U.S. application Ser. No. 12/716,707, filed Mar. 3, 2010 now U.S. Pat. No. 8,356,804 B2, which claims the priority of United Kingdom Application Nos. 0903690.6, filed 4 Mar. 2009, and 0915033.5, filed 28 Aug. 2009, the entire contents of which are incorporated herein by reference.

FIELD OF THE INVENTION

The present invention relates to humidifying apparatus. In a preferred embodiment, the present invention relates to humidifying apparatus comprising a fan assembly for generating an air current for dispersing moist air within a domestic environment, such as a room, office or the like.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

The flow rate of the air emitted from such a humidifier tends to be relatively low, for example in the range from 1 to 2 liters per second, and so the rate at which the humid air is dispersed into a room can be very low. Furthermore, as the relative humidity of the air in the local environment of the humidifier will rise relatively rapidly in comparison to that of the air in the local environment of the user, the relative humidity detected by the sensor will not, at least initially, be indicative of the relative humidity of the air local to the user. As a result, the actuation of the transducer may be stopped when the relative humidity of the air in the local environment of the user is significantly below the desired level. Due to the relative low rate at which the humid air is dispersed into the room, it can then take some time for the detected relative humidity to fall to a level at which the actuation of the transducer is restarted. Consequently, it may take a long period of time for the relative humidity of the air in the local environment of the user to reach the desired level.

SUMMARY OF THE INVENTION

In a first aspect the present invention provides humidifying apparatus comprising a humidifier for emitting moist air into an external environment, a fan assembly for generating an air current within the external environment for conveying the emitted moist air away from the humidifier, the fan assembly comprising means for creating an air flow and a nozzle comprising an interior passage for receiving the air flow and a mouth for emitting the air flow, the humidifier being located behind nozzle, the nozzle extending about and defining an opening through which both air from outside the nozzle and the moist air emitted from the humidifier are drawn by the air flow emitted from the mouth.

An advantage for a user is that through the entrainment of the moist air emitted from the humidifier within an air current generated by the fan assembly, the moisture within the air current can be rapidly conveyed away from the humidifier to a distance of up to several meters. This can enable a user located several meters away from the humidifier to experience a rapid rise in the relative humidity of the air in its local environment.

In order to promote a rapid rise in the relative humidity of the air in the environment local to the user, the humidifier may comprise a plurality of transducers for atomizing water stored in the reservoir, and a drive circuit arranged to actuate an initial number $n_1$ of the transducers to increase the relative humidity detected by the sensor to a preset level. This level may be preset by a user using a user-operable dial or button located on the humidifier, and may, for example, be any relative humidity within the range from 30 to 80% at 20° C. In a preferred embodiment the humidifier comprises two transducers and initially these two transducers are actuated simultaneously by the drive circuit to increase the relative humidity detected by the sensor to the preset level. Thus, $n_1$ may be two, but the humidifier may be provided with a greater number of transducers, for example three, four or six, depending on the relative size of the humidifying apparatus.

The actuation of the initial number $n_1$ of the transducers may be stopped when the preset level has been detected by the sensor, or when the detected relative humidity is a certain amount over the preset level. For example, in a preferred embodiment the actuation of the initial number $n_1$ of the transducers is stopped when the detected relative humidity is 1% at 20° C. higher than the preset level.

The drive circuit may be arranged to actuate a subsequent lower number $n_2$ of the transducers to maintain the detected relative humidity around the preset level. The actuation of the lower number $n_2$ of the transducers is preferably started when the detected relative humidity has fallen beneath the preset level by a certain amount. For example, in the preferred embodiment the actuation of the lower number $n_2$ of the transducers is started when the detected relative humidity has fallen beneath the preset level by approximately 1% at 20° C., and is continued until the detected relative humidity has risen above the preset level by approximately 1% at 20° C. A lower number $n_2$ of the transducers is thus periodically actuated to maintain the detected relative humidity around the preset level until the water stored within the reservoir has been depleted or until the humidifier is switched off, either manually by the user or at the end of a preset time period. We have found that actuation of this lower number $n_2$ of the transducers is sufficient to maintain the detected relative humidity around the preset level. Consequently, the life time of the plurality of transducers may be increased in comparison to a situation in which the initial number $n_1$ of the transducers is actuated to maintain the detected relative humidity around the preset level.

The plurality of transducers preferably comprises a first subset of $n_2$ transducers and a second subset of $n_2$ transducers, and the drive circuit is preferably arranged to actuate a selected one of the first and second subsets of transducers when the detected relative humidity has fallen below the preset level. In order to maximise the life time of each of these subsets of $n_2$ transducers, the drive circuit is preferably arranged to actuate the first and second subsets of transducers alternately. In a preferred embodiment each subset of transducers comprises a single transducer but each subset may comprise a higher number of transducers depending on the overall number of transducers within the humidifier.

By conveying the emitted moist air away from the humidifier the relative humidity detected by the sensor may provide a more accurate indication of the relative humidity of the air in the environment in which the humidifying apparatus is located than when no such fan assembly is used to convey the emitted moist air away from the humidifier. The sensor may be conveniently housed in the humidifier, but the sensor may be located outside the humidifier, for example on a power cable for supplying electrical power to the humidifier.

The fan assembly may be integral with the humidifier. However, the fan assembly is preferably a free standing fan assembly located in front of the humidifier so that the moist air emitted from the humidifier is drawn into the air generated by the fan assembly.

The fan assembly is preferably in the form of a bladeless fan assembly. Through use of a bladeless fan assembly an air current can be generated without the use of a bladed fan. In comparison to a bladed fan assembly, the bladeless fan assembly leads to a reduction in both moving parts and complexity. Furthermore, without the use of a bladed fan to project the air current from the fan assembly, a relatively uniform air current can be generated and guided into a room or towards a user. The air current can travel efficiently out from the nozzle, losing little energy and velocity to turbulence.

The term 'bladeless' is used to describe a fan assembly in which air flow is emitted or projected forward from the fan assembly without the use of moving blades. Consequently, a bladeless fan assembly can be considered to have an output area, or emission zone, absent moving blades from which the air flow is directed towards a user or into a room. The output area of the bladeless fan assembly may be supplied with a primary air flow generated by one of a variety of different sources, such as pumps, generators, motors or other fluid transfer devices, and which may include a rotating device such as a motor rotor and/or a bladed impeller for generating the air flow. The generated primary air flow can pass from the room space or other environment outside the fan assembly through the interior passage to the nozzle, and then back out to the room space through the mouth of the nozzle.

Hence, the description of a fan assembly as bladeless is not intended to extend to the description of the power source and components such as motors that are required for secondary fan functions. Examples of secondary fan functions can include lighting, adjustment and oscillation of the fan assembly.

The shape of the nozzle of a bladeless fan assembly is thus not constrained by the requirement to include space for a bladed fan. Preferably, the nozzle surrounds the opening. The nozzle may be an annular nozzle which preferably has a height in the range from 200 to 400 mm. The interior passage is preferably annular, and is preferably shaped to divide the air flow into two air streams which flow in opposite directions around the opening.

Preferably, the mouth of the nozzle extends about the opening, and is preferably annular. The nozzle preferably comprises an inner casing section and an outer casing section which define the interior passage and the mouth of the nozzle. Each section is preferably formed from a respective annular member, but each section may be provided by a plurality of members connected together or otherwise assembled to form that section. The outer casing section is preferably shaped so as to partially overlap the inner casing section to define an outlet of the mouth between overlapping portions of the external surface of the inner casing section and the internal surface of the outer casing section of the nozzle. The outlet is preferably in the form of a slot, preferably having a width in the range from 0.5 to 5 mm. The nozzle may comprise a plurality of spacers for urging apart the overlapping portions of the inner casing section and the outer casing section of the nozzle. This can assist in maintaining a substantially uniform outlet width about the opening. The spacers are preferably evenly spaced along the outlet.

The nozzle may be inclined so that the air current is emitted upwardly from the fan assembly. For example, the nozzle may be inclined so that the air current is emitted at an angle in the range from 5 to 25° to the horizontal. This can enable the current of moist air emitted from the apparatus to be angled away from a floor or other surface upon which the apparatus is located. This can reduce the risk of the moisture within the air flow collecting on the surface, rather than evaporating into the atmosphere. The fan assembly preferably comprises means for oscillating the nozzle relative to the humidifier so that the humid air current is swept over an arc, preferably in the range from 60 to 120°. For example, a base of the fan assembly may comprise means for oscillating an upper part of the base, to which the nozzle is connected, relative to a lower part of the base.

The nozzle may comprise a surface located adjacent the mouth and over which the mouth is arranged to direct the air flow emitted therefrom. This surface is preferably a Coanda surface. Preferably, the external surface of the inner casing section of the nozzle is shaped to define the Coanda surface. The Coanda surface preferably extends about the opening. A Coanda surface is a known type of surface over which fluid flow exiting an output orifice close to the surface exhibits the Coanda effect. The fluid tends to flow over the surface closely, almost 'clinging to' or 'hugging' the surface. The Coanda effect is already a proven, well documented method of entrainment in which a primary air flow is directed over a Coanda surface. A description of the features of a Coanda surface, and the effect of fluid flow over a Coanda surface, can be found in articles such as Reba, Scientific American, Volume 214, June 1966 pages 84 to 92. Through use of a Coanda surface, an increased amount of air from outside the fan assembly is drawn through the opening by the air emitted from the mouth.

In the present invention an air flow is created through the nozzle of the fan assembly. In the following description this air flow will be referred to as a primary air flow. The primary air flow is emitted from the mouth of the nozzle and preferably passes over a Coanda surface. The primary air flow entrains air surrounding the mouth of the nozzle, which acts as an air amplifier to supply both the primary air flow and the entrained air to the user. The entrained air will be referred to here as a secondary air flow. The secondary air flow is drawn from the room space, region or external environment surrounding the mouth of the nozzle and, by displacement, from other regions around the fan assembly, and passes predominantly through the opening defined by the nozzle. The primary air flow directed over the Coanda surface combined with the entrained secondary air flow equates to a total air flow emitted or projected forward from the opening defined by the nozzle.

Preferably, the humidifier comprises a mist outlet located directly behind part, preferably the lowest part, of the Coanda surface of the nozzle. The speed at which the air flows through the opening of the nozzle tends to reach a maximum value adjacent the Coanda surface, and so through positioning the mist outlet directly behind part of the Coanda surface the mist can become entrained within the part of the air flow drawn into the opening with the greatest speed. This can maximise the speed with which the water droplets within the air current are emitted from the humidifying apparatus. The humidifying apparatus may be provided with a support upon which the humidifier may be located in order to raise the humidifier so that mist outlet is substantially level with the lowest part of the Coanda surface of the nozzle.

Preferably, the nozzle comprises a diffuser surface located downstream of the Coanda surface. The external surface of the inner casing section of the nozzle is preferably shaped to define the diffuser surface.

Preferably the means for creating an air flow through the nozzle comprises an impeller driven by a motor. This can provide a fan assembly with efficient air flow generation. The means for creating an air flow preferably comprises a DC brushless motor and a mixed flow impeller. This can avoid frictional losses and carbon debris from the brushes used in a traditional brushed motor. Reducing carbon debris and emissions is advantageous in a clean or pollutant sensitive environment such as a hospital or around those with allergies. While induction motors, which are generally used in bladed fans, also have no brushes, a DC brushless motor can provide a much wider range of operating speeds than an induction motor.

The humidifier may comprise a base having a lower surface shaped to define a channel for receiving a mains cable of the fan assembly. Allowing part of a mains cable of the fan assembly to be arranged beneath the base of the humidifier reduces the amount of that cable which is exposed, for example on a work counter.

In a second aspect the present invention provides humidifying apparatus comprising a humidifier for emitting moist air into an external environment, a fan assembly for generating an air current within the external environment for conveying the emitted moist air away from the humidifier, and a sensor for detecting the relative humidity of air in the external environment, the humidifier comprising a water reservoir, a plurality of transducers for atomizing water stored in the reservoir, and a drive circuit arranged to actuate an initial number $n_1$ of the transducers to increase the relative humidity detected by the sensor to a preset level, and to actuate a subsequent, preferably lower, number $n_2$ of the transducers to maintain the detected relative humidity around the preset level.

Features described above in connection with the first aspect of the invention are equally applicable to the second aspect of the invention.

BRIEF DESCRIPTION OF THE DRAWINGS

An embodiment of the present invention will now be described, by way of example only, with reference to the accompanying drawings, in which:

FIG. 1 is a perspective view of a humidifying apparatus;

FIG. 2 is a side view of the apparatus of FIG. 1;

FIG. 3 is a side sectional view of the fan assembly of the apparatus of FIG. 1;

FIG. 4 is an enlarged sectional view of part of the nozzle of the fan assembly of the apparatus of FIG. 1;

FIG. 5 is a top view of the humidifier of the apparatus of FIG. 1;

FIG. 6 is a side sectional view of the humidifier, taken along line D-D in FIG. 5;

FIG. 7 is a top view of the base of the humidifier of FIG. 5;

FIG. 8 is a top sectional view of the base of the humidifier, taken along line E-E in FIG. 6;

FIG. 9 is a side sectional view of the base of the humidifier, taken along line J-J in FIG. 7;

FIG. 10 is a schematic illustration of the control system of the humidifier;

FIG. 11 is a graph illustrating the variation with time of the relative humidity detected by the sensor of the humidifying apparatus of FIG. 1.

DETAILED DESCRIPTION OF THE INVENTION

With reference first to FIGS. 1 and 2, an example of a humidifying apparatus comprises a fan assembly 10 and a humidifier 100 located behind the fan assembly 10. The fan assembly 10 is preferably in the form of a bladeless fan assembly comprising a stand 12 and a nozzle 14 mounted on and supported by the stand 12. The stand 12 comprises a substantially cylindrical outer casing 16 having a plurality of air inlets in the form of a grille 18 formed in the outer casing 16 and through which a primary air flow is drawn into the stand 12 from the external environment. The stand 12 further comprises a plurality of user-operable buttons 20 and a user-operable dial 22 for controlling the operation of the fan assembly 10. In this example the stand 12 has a height in the range from 200 to 300 mm, and the outer casing 16 has an external diameter in the range from 100 to 200 mm.

The nozzle 14 has an annular shape and defines a central opening 24. The nozzle 14 has a height in the range from 200 to 400 mm. The nozzle 14 comprises a mouth 26 located towards the rear of the fan assembly 10 for emitting air from the fan assembly 10 and through the opening 24. The mouth 26 extends at least partially about the opening 24. The inner periphery of the nozzle 14 comprises a Coanda surface 28 located adjacent the mouth 26 and over which the mouth 26 directs the air emitted from the fan assembly 10, a diffuser surface 30 located downstream of the Coanda surface 28 and a guide surface 32 located downstream of the diffuser surface 30. The diffuser surface 30 is arranged to taper away from the central axis X of the opening 24 in such a way so as to assist the flow of air emitted from the fan assembly 10. The angle subtended between the diffuser surface 30 and the central axis X of the opening 24 is in the range from 5 to 25°, and in this example is around 15°. The guide surface 32 is arranged at an angle to the diffuser surface 30 to further assist the efficient delivery of a cooling air flow from the fan assembly 10. The guide surface 32 is preferably arranged substantially parallel to the central axis X of the opening 24 to present a substantially flat and substantially smooth face to the air flow emitted from the mouth 26. A visually appealing tapered surface 34 is located downstream from the guide surface 32, terminating at a tip surface 36 lying substantially perpendicular to the central axis X of the opening 24. The angle subtended between the tapered surface 34 and the central axis X of the opening 24 is preferably around 45°. The overall depth of the nozzle 24 in a direction extending along the central axis X of the opening 24 is in the range from 100 to 150 mm, and in this example is around 110 mm.

FIG. 3 illustrates a sectional view through the fan assembly 10. The stand 12 comprises a base formed from a lower base member 38 and an upper base member 40 mounted on the lower base member 38, and a main body 42 mounted on the base. The lower base member 38 has a substantially flat bottom surface 43. The upper base member 40 houses a controller 44 for controlling the operation of the fan assembly 10 in response to depression of the user operable buttons 20 shown in FIGS. 1 and 2, and/or manipulation of the user operable dial 22. The lower base member 38 may house an oscillating mechanism 46 for oscillating the upper base member 40 and the main body 42 relative to the lower base member 38. The range of each oscillation cycle of the main body 42 is preferably between 60° and 120°, and in this example is around 90°. In this example, the oscillating mechanism 46 is arranged to perform around 3 to 5 oscillation cycles per minute. A mains power cable 48 extends through an aperture formed in the lower base member 38 for supplying electrical power to the fan assembly 10.

The main body 42 of the stand 12 has an open upper end to which the nozzle 14 is connected, for example by a snap-fit connection. The main body 42 houses an impeller 52 for drawing a primary air flow through the apertures of the grille 18 and into the stand 12. Preferably, the impeller 52 is in the form of a mixed flow impeller. The impeller 52 is connected to a rotary shaft 54 extending outwardly from a motor 56. In this example, the motor 56 is a DC brushless motor having a speed which is variable by the controller 44 in response to user manipulation of the dial 22. Cable 57 connects the controller 44 to the motor 56. The maximum speed of the motor 56 is preferably in the range from 5,000 to 10,000 rpm. The motor 56 is housed within a motor bucket comprising an upper portion 58 connected to a lower portion 60. One of the upper portion 58 and the lower portion 60 of the motor bucket comprises a diffuser 62 in the form of a stationary disc having spiral blades, and which is located downstream from the impeller 52.

The motor bucket is located within, and mounted on, an impeller housing 64. The impeller housing 64 is, in turn, mounted on a plurality of angularly spaced supports 66, in this example three supports, located within the main body 42 of the stand 12. A generally frusto-conical shroud 68 is located within the impeller housing 64. The shroud 68 is shaped so that the outer edges of the impeller 52 are in close proximity to, but do not contact, the inner surface of the shroud 68. A substantially annular inlet member 70 is connected to the bottom of the impeller housing 64 for guiding the primary air flow into the impeller housing 64. Preferably, the stand 12 further comprises silencing foam for reducing noise emissions from the stand 12. In this example, the main body 42 of the stand 12 comprises a disc-shaped foam member 72 located towards the base of the main body 42, and a substantially annular foam member 74 located within the motor bucket.

Figure 4:
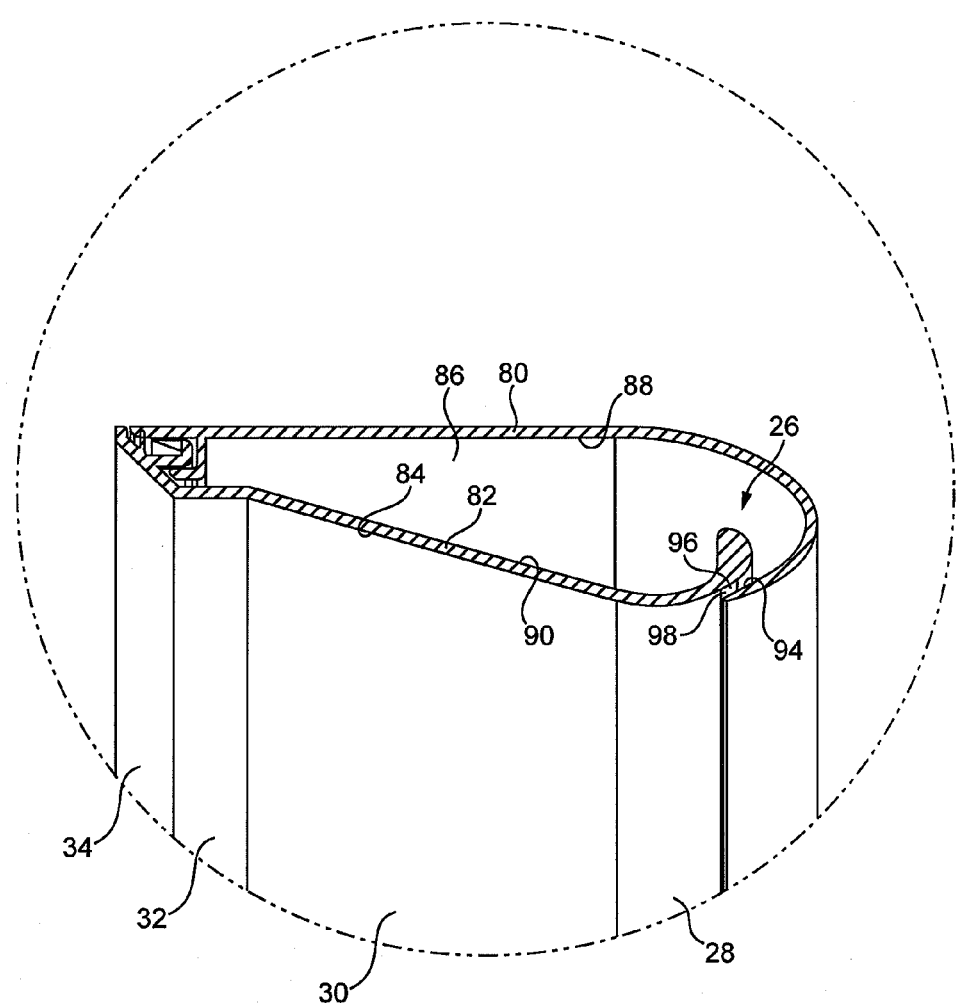

FIG. 4 illustrates a sectional view through the nozzle 14. The nozzle 14 comprises an annular outer casing section 80 connected to and extending about an annular inner casing section 82. Each of these sections may be formed from a plurality of connected parts, but in this embodiment each of the outer casing section 80 and the inner casing section 82 is formed from a respective, single moulded part. The inner casing section 82 defines the central opening 24 of the nozzle 14, and has an external peripheral surface 84 which is shaped to define the Coanda surface 28, diffuser surface 30, guide surface 32 and tapered surface 34.

The outer casing section 80 and the inner casing section 82 together define an annular interior passage 86 of the nozzle 14. Thus, the interior passage 86 extends about the opening 24. The interior passage 86 is bounded by the internal peripheral surface 88 of the outer casing section 80 and the internal peripheral surface 90 of the inner casing section 82. The outer casing section 80 comprises a base 92 which is connected to, and over, the open upper end of the main body 42 of the stand 12, for example by a snap-fit connection. The base 92 of the outer casing section 80 comprises an aperture through which the primary air flow enters the interior passage 86 of the nozzle 14 from the open upper end of the main body 42 of the stand 12.

The mouth 26 of the nozzle 14 is located towards the rear of the fan assembly 10. The mouth 26 is defined by overlapping, or facing, portions 94, 96 of the internal peripheral surface 88 of the outer casing section 80 and the external peripheral surface 84 of the inner casing section 82, respectively. In this example, the mouth 26 is substantially annular and, as illustrated in FIG. 4, has a substantially U-shaped cross-section when sectioned along a line passing diametrically through the nozzle 14. In this example, the overlapping portions 94, 96 of the internal peripheral surface 88 of the outer casing section 80 and the external peripheral surface 84 of the inner casing section 82 are shaped so that the mouth 26 tapers towards an outlet 98 arranged to direct the primary flow over the Coanda surface 28. The outlet 98 is in the form of an annular slot, preferably having a relatively constant width in the range from 0.5 to 5 mm. In this example the outlet 98 has a width of around 1.0 mm. Spacers may be spaced about the mouth 26 for urging apart the overlapping portions 94, 96 of the internal peripheral surface 88 of the outer casing section 80 and the external peripheral surface 84 of the inner casing section 82 to maintain the width of the outlet 98 at the desired level. These spacers may be integral with either the internal peripheral surface 88 of the outer casing section 80 or the external peripheral surface 84 of the inner casing section 82.

Figure 2:
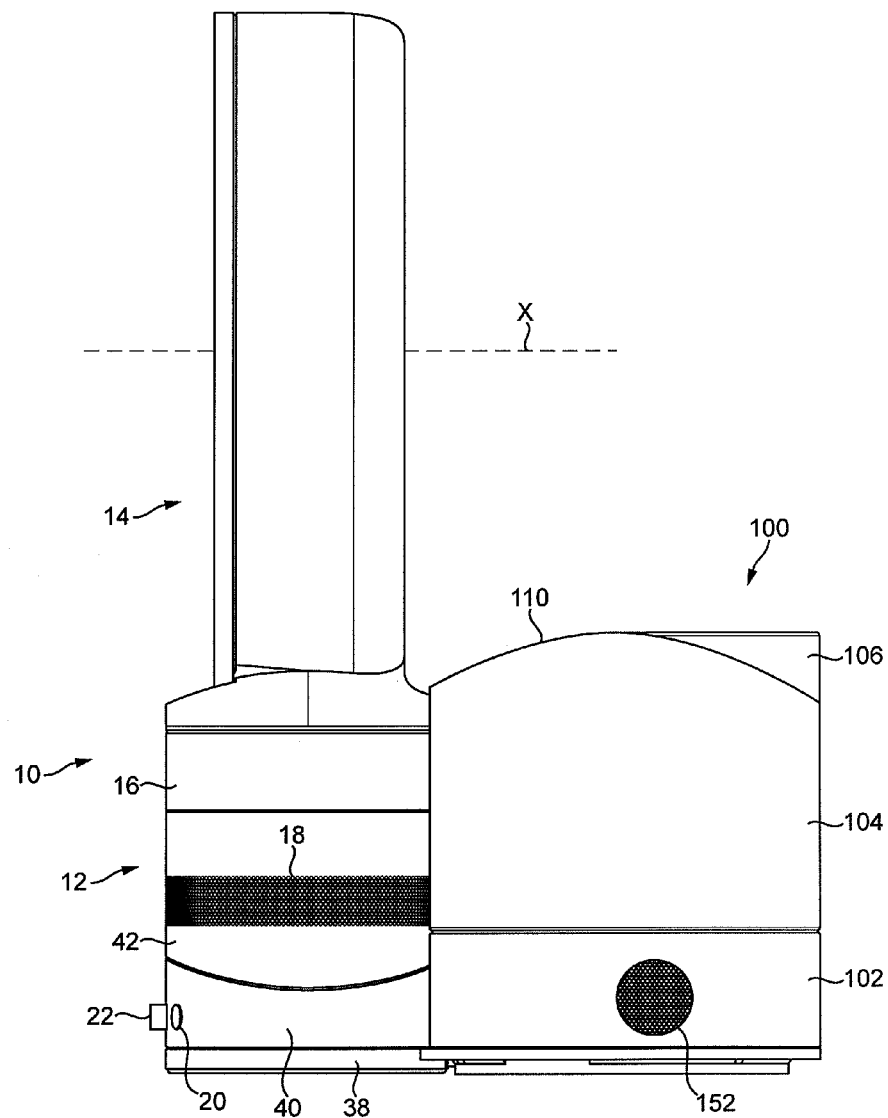
Figure 3:
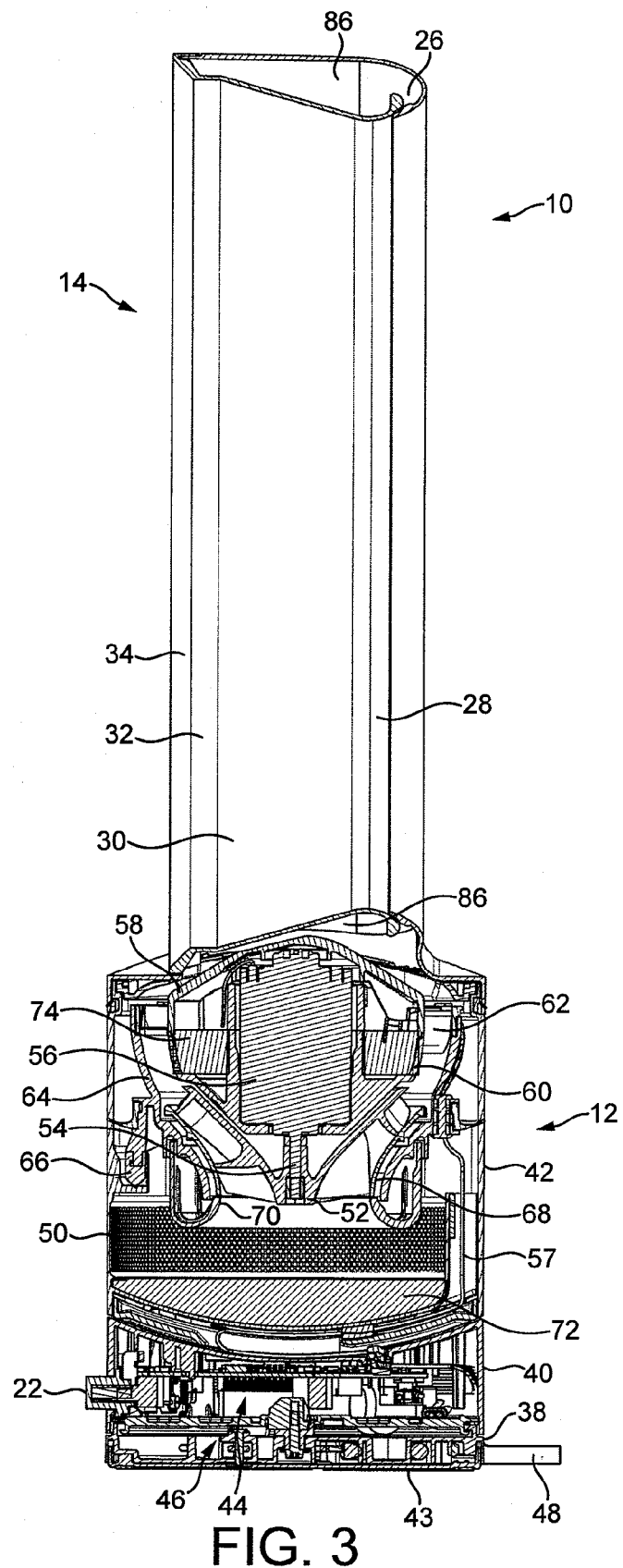
Figure 5:
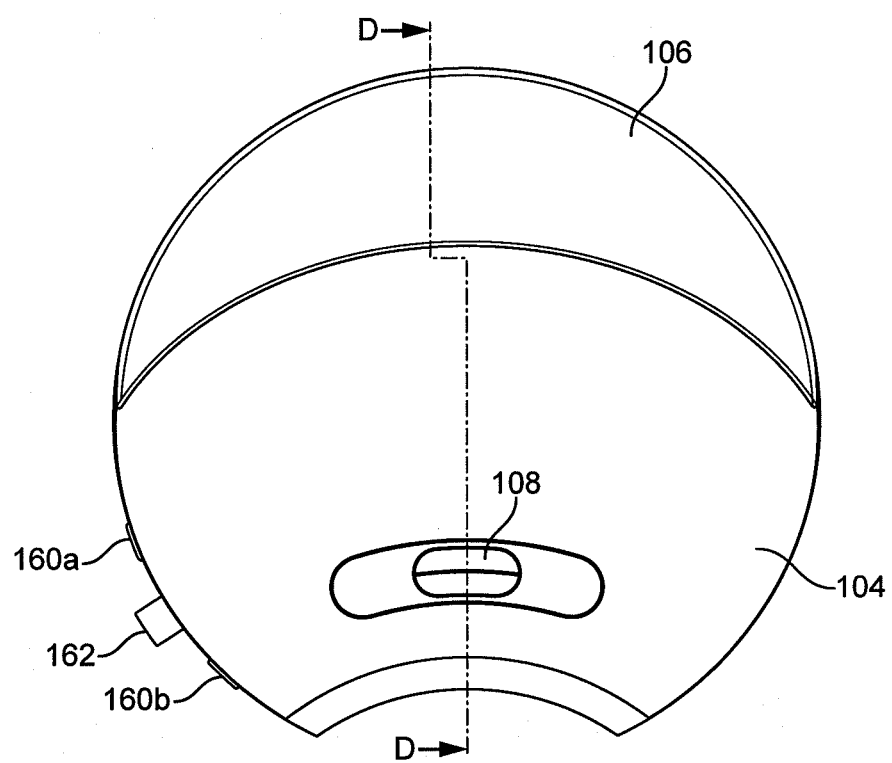
Figure 6:
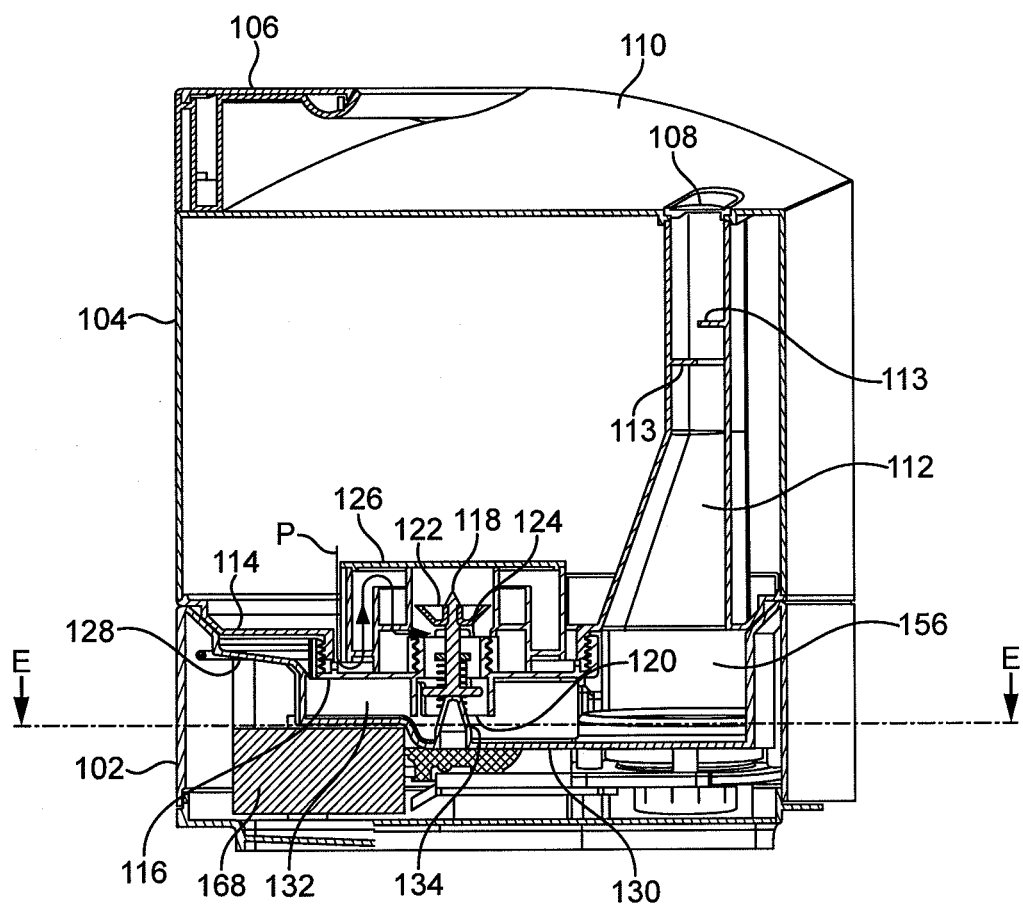

Turning now to FIGS. 1, 2 and 5, the humidifier 100 comprises a base 102 and a water tank 104 removably mountable on the base 102. The water tank 104 preferably has a capacity in the range from 2 to 4 liters. The upper surface of the water tank 104 is shaped to define a handle 106 to enable a user to lift the water tank 104 from the base 102 using one hand. The water tank 104 comprises a mist outlet 108 located in the upper surface 110 of the water tank 104 for emitting moist air, or mist, from the humidifier 100. With reference to FIG. 6, mist is conveyed to the mist outlet 108 from a duct 112 passing upwardly through the water tank 104, resulting in the emission of mist from the humidifier 100 in a generally vertical direction. Baffles 113 are located within the duct 112 to inhibit the emission of relatively large water droplets from the humidifier 100.

The base 102 and the water tank 104 each comprise a concave front section having a radius which is approximately the same size as the radius of the outer casing 16 of the stand 12 of the fan assembly 10. This allows the humidifier 100 to be located adjacent the fan assembly 100 so that the mist outlet 108 is in close proximity to the nozzle 14 of the fan assembly. In this example, the mist outlet 108 can be spaced from the rear surface of the nozzle 14 of the fan assembly 10 by a minimum distance in the range from 5 to 30 cm. The mist outlet 108 is preferably located directly behind, and approximately level with, the lowest portion of the Coanda surface 28 of the nozzle 14 of the fan assembly 10. If required, the humidifier 100 may be mounted on a support (not shown) to raise the mist outlet 108 so that it is level with the lowest portion of the Coanda surface 28 of the nozzle 14.

The water tank 104 has a lower surface 114 to which a spout 116 is removably connected, for example through co-operating threaded connections. In this example the water tank 104 is filled by removing the water tank 104 from the base 102 and inverting the water tank 104 so that the spout 116 is projecting upwardly. The spout 116 is then unscrewed from the lower surface 114 of the water tank 104 and water is introduced into the water tank 104 through an aperture exposed when the spout 116 is disconnected from the lower surface 114 of the water tank 104. Once the water tank 104 has been filled, the user reconnects the spout 116 to the lower surface 114 of the water tank 104, re-inverts the water tank 104 and replaces the water tank 104 on the base 102. A spring-loaded valve 118 is located within the spout 116 for preventing leakage of water through a water outlet 120 of the spout 116 when the water tank 104 is re-inverted. The valve 118 is biased towards a position in which a skirt 122 of the valve 118 engages the upper surface of the spout 116 to prevent water entering a water inlet 124 of the spout 116 from the water tank 104.

A water softener cartridge 126 is removably connected to the spout 116, for example through co-operating threaded connections. The cartridge 126 may contain an ion-exchange resin, threshold inhibitor chemical, such as polyphosphate, or other media to affect the precipitation of limescale. The cartridge 126 defines a serpentine path, illustrated at P in FIG. 6, along which water flows as it passes from the water tank 104 to the spout 116 to increase the residence time of the water within the cartridge 126. Perforations may be formed on the upper surface of the cartridge 126 to allow air within the cartridge 126 to be displaced therefrom as water enters the cartridge 126 from the water tank 104.

Figure 7:
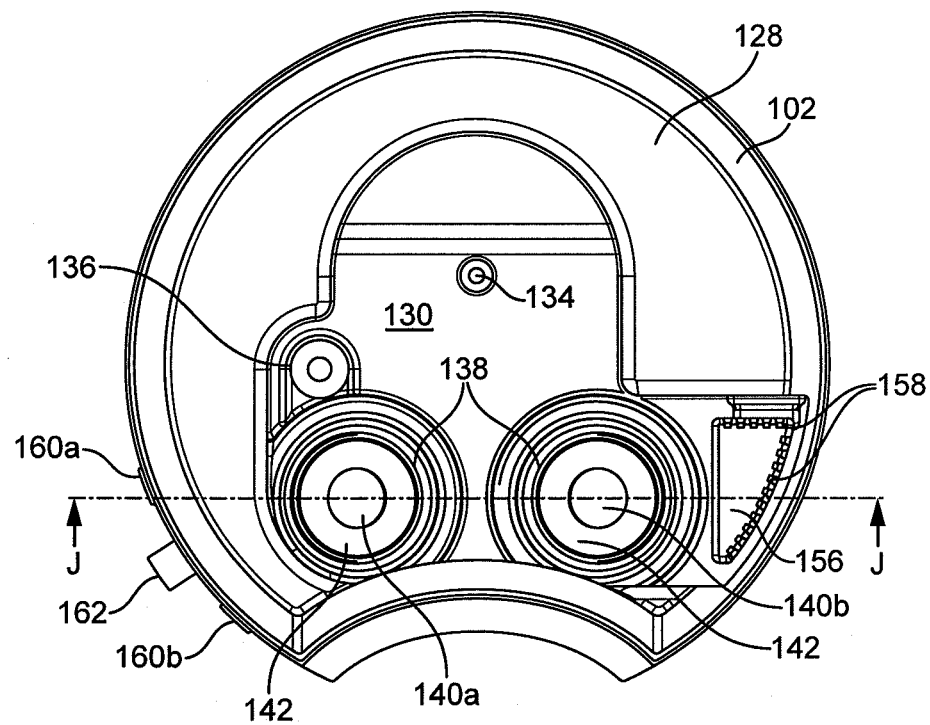
Figure 8:
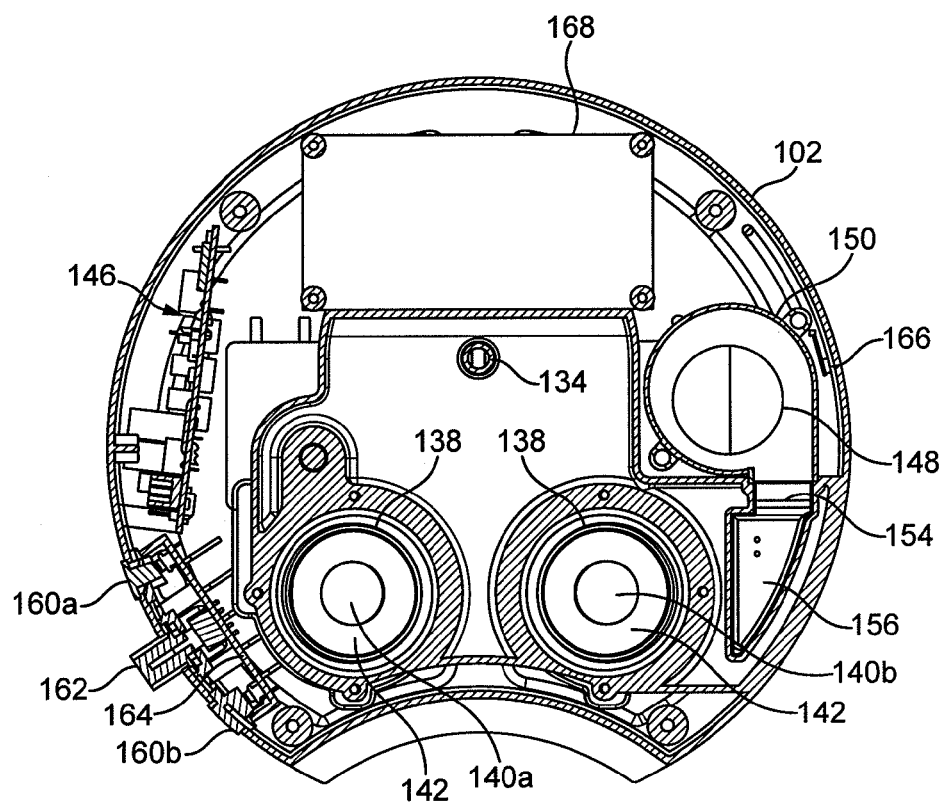
Figure 9:
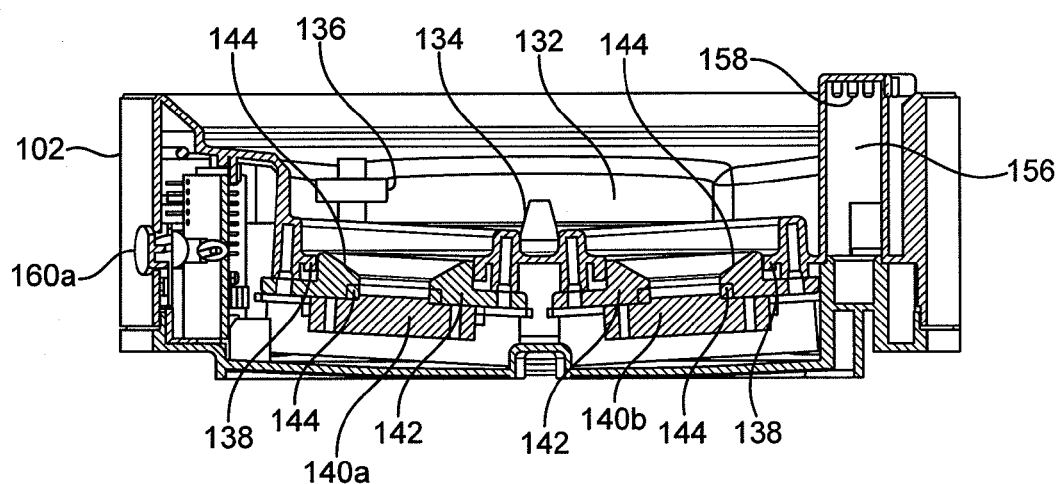

With reference also to FIGS. 7 to 9, the base 102 has an upper surface 128. The upper surface 128 of the base 102 comprises a recessed portion 130 which defines a water reservoir 132 for receiving water from the water tank 104. A pin 134 extending upwardly from the recessed portion 130 of the upper surface 128 protrudes into the spout 116 when the water tank 104 is located on the base 102. The pin 134 pushes the valve 118 upwardly to open the spout 116, thereby allowing water to pass under gravity into the water reservoir 132 from the water tank 104. This results in the water reservoir 132 becoming filled with water to a level which is substantially co-planar with the upper surface of the pin 134. A magnetic level sensor 136 is located within the water reservoir 132 for detecting the level of water within the water reservoir 132.

Figure 10:
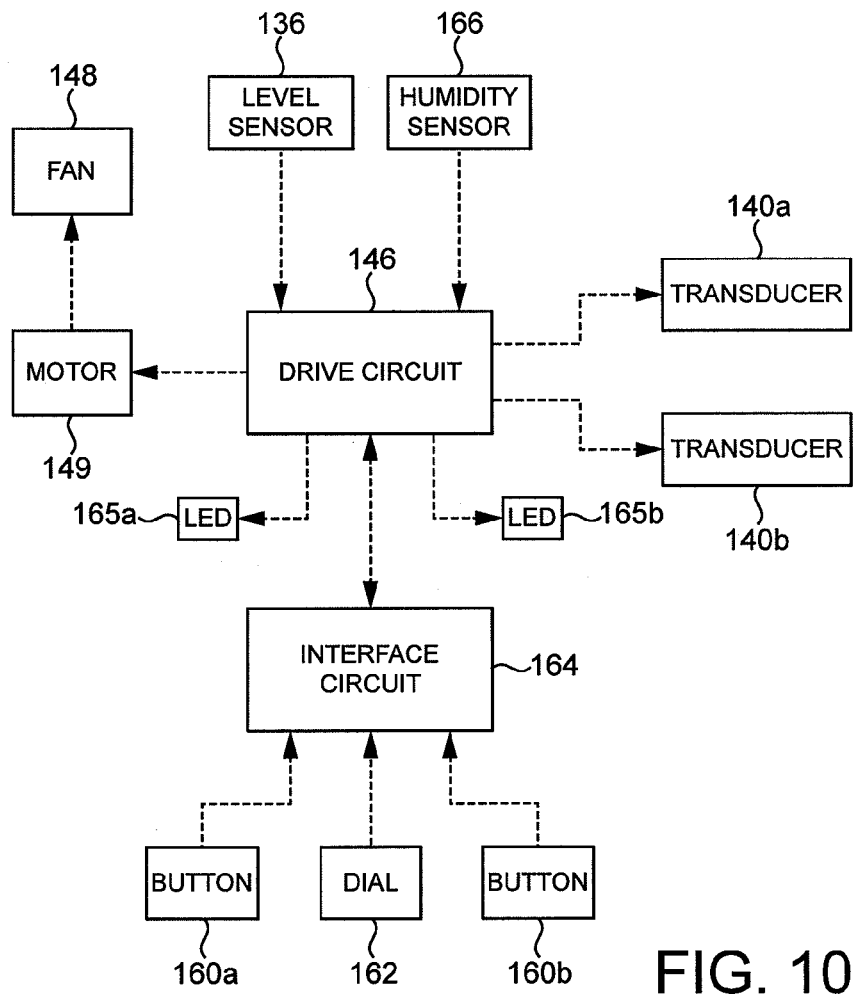

The recessed portion 130 of the upper surface 128 comprises two apertures 138 each for exposing the surface of a respective piezoelectric transducer 140a, 140b located beneath the upper surface 128 of the base 102 for atomising water stored in the water reservoir 132. An annular metallic heat sink 142 is located between the base 102 and each transducer 140a, 140b for transferring heat from the transducer to the water stored in the water reservoir 132. Each heat sink 142 has a conical upper surface 144 for increasing the rate of atomisation of water by the transducers 140a, 140b. The atomisation rate is further increased by inclining the upper surfaces of the transducers 140a, 140b at an angle in the range from 5 to 10° to the horizontal. An annular sealing member 144 forms a water-tight seal between each transducer 140a, 140b and its heat sink 142. A drive circuit 146 is located beneath the upper surface 128 of the base 102 for actuating ultrasonic vibration of the transducers 140a, 140b to atomise water within the water reservoir 132. As illustrated in FIG. 10, the drive circuit 146 may be arranged to receive a signal from the level sensor 136 which is indicative of the level of the water in the water reservoir 132 falling below a minimum level. In response to this signal, the drive circuit 146 terminates actuation of the transducers 140a, 140b.

The base 102 further comprises a motor-driven fan 148 for generating an air flow through the humidifier 100, preferably at a rate in the range from 1 to 2 liters per second. The drive circuit 146 preferably controls the actuation and the speed of the motor 149 for driving the fan 148. The fan 148 is located within a fan housing 150 formed in the base 102 of the humidifier 100. The fan housing 150 comprises an air inlet in the form of a plurality of apertures 152 formed in the side wall of the base 102 and through which an air flow is drawn into the fan housing 150 by rotation of the fan 148, and an air outlet 154 through which the air flow passes into an air duct 156 located to one side of the water reservoir 132. Apertures 158 are located on the upper periphery of the air duct 156 for emitting the air flow from the air duct at a level which is above the maximum level for water stored in the water reservoir 132 so that the air flow emitted from the air duct 156 passes over the surface of the water located in the water reservoir 132 before entering the duct 112 of the water tank 102.

A user interface for controlling the operation of the humidifier 100 is located on the side wall of the base 102. In this example, the user interface comprises a plurality of user-operable buttons 160a, 160b and a user-operable dial 162. The dial 162 may be manipulated by the user to set a desired level for the relative humidity of the environment in which the humidifying apparatus is located, such as a room, office or other domestic environment. For example, the desired relative humidity level may be selected within a range from 30 to 80% at 20° C. through manipulation of the dial 162. One of the buttons 160a is an on/off button for the humidifier 100, whereas the other button 160b may be depressed to override the dial setting so that the humidifier 100 continues to operate until the water tank 102 has emptied. The user interface further comprises a user interface circuit 164 which outputs control signals to the drive circuit 146 which are indicative of the angular position of the dial 162 and upon depression of one of the buttons 160, and which receives control signals output by the drive circuit 146. The user interface may also comprise one or more LEDs (shown in FIG. 10) for providing a visual alert depending on a status of the humidifier 100. For example, an LED 165a may be illuminated by the drive circuit 146 indicating that the water tank 104 has become depleted, as indicated by a signal received by the drive circuit 146 from the level sensor 136.

The humidifier 100 further comprises a humidity sensor 166 for detecting the relative humidity of air in the external environment, and for supplying a signal indicative of the detected relative humidity to the drive circuit 146. In this example the humidity sensor 166 is located immediately behind the apertures 152 formed in the side wall of the base 102 to detect the relative humidity of the air flow drawn into the base 104 of the humidifier 100 by the fan 148. The user interface may comprise an LED 165b which is illuminated by the drive circuit 146 when an output from the humidity sensor 166 indicates that the relative humidity of the air flow entering the base 102 is at or above the desired relative humidity level set by the user.

The humidifier 100 also comprises a power supply 168 for supplying power to the various electrical components of the humidifier 100, including the drive circuit 146, the motor for driving the fan 148 and the user interface circuit 164. A mains power cable (not shown) extends through an aperture formed in the base 102 for supplying electrical power to the power supply 168.

The operation of the humidifying apparatus will now be described.

To operate the fan assembly 10, the user depresses an appropriate one of the buttons 20 on the stand 12 of the fan assembly 10, in response to which the controller 44 activates the motor 56 to rotate the impeller 52. The rotation of the impeller 52 causes a primary air flow to be drawn into the stand 12 of the fan assembly 10 through the grille 18. The primary air flow passes sequentially through the impeller housing 64 and the aperture formed in the base 92 of the outer casing section 80 of the nozzle 14 to enter the interior passage 86 of the nozzle 14. Within the nozzle 14, the primary air flow is divided into two air streams which pass in opposite directions around the central opening 24 of the nozzle 14. As the air streams pass through the interior passage 86, air enters the mouth 26 of the nozzle 14. The air flow into the mouth 26 is preferably substantially even about the opening 24 of the nozzle 14. Within each section of the mouth 26, the flow direction of the portion of the air stream is substantially reversed. The portion of the air stream is constricted by the tapering section of the mouth 26 and emitted through the outlet 98.

The primary air flow emitted from the mouth 26 is directed over the Coanda surface 28 of the nozzle 14, causing a secondary air flow to be generated by the entrainment of air from the external environment, specifically from the region around the outlet 98 of the mouth 26 and from around the rear of the nozzle 14. This secondary air flow passes through the central opening 24 of the nozzle 14, where it combines with the primary air flow to produce a total air flow, or air current, projected forward from the nozzle 14. Depending on the speed of the motor 56, the mass flow rate of the air current projected forward from the fan assembly 10 may be up to 400 liters per second, preferably up to 600 liters per second.

The even distribution of the primary air flow along the mouth 26 of the nozzle 14 ensures that the air flow passes evenly over the diffuser surface 30. The diffuser surface 30 causes the mean speed of the air flow to be reduced by moving the air flow through a region of controlled expansion. The relatively shallow angle of the diffuser surface 30 to the central axis X of the opening 24 allows the expansion of the air flow to occur gradually. A harsh or rapid divergence would otherwise cause the air flow to become disrupted, generating vortices in the expansion region. Such vortices can lead to an increase in turbulence and associated noise in the air flow which can be undesirable, particularly in a domestic product such as a fan. The air flow projected forwards beyond the diffuser surface 30 can tend to continue to diverge. The presence of the guide surface 32 extending substantially parallel to the central axis X of the opening 30 further converges the air flow. As a result, the air flow can travel efficiently out from the nozzle 14, enabling the air flow can be experienced rapidly at a distance of several meters from the fan assembly 10.

When the fan assembly 10 is operating, the user may switch on the humidifier 100 by pressing the appropriate button 160a of the user interface of the humidifier 100. In response to the depression of the button 160a, the drive circuit 146 activates the motor 149 to rotate the fan 148 to generate an air flow through the humidifier 100. Simultaneous with the actuation of the motor 149 of the fan 148, the drive circuit 146 actuates the vibration of both of the transducers 140a, 140b, preferably at a frequency in the range from 1 to 2 MHz, to atomise water present within the water reservoir 132. This creates airborne water droplets above the water located within the water reservoir 132. As water within the water reservoir 132 is atomised, the water reservoir 132 is constantly replenished with water from the water tank 104, so that the level of water within the water reservoir 132 remains substantially constant while the level of water within the water tank 104 gradually falls.

With rotation of the fan 148, an air flow is drawn into the humidifier 100 through the apertures 152 formed in the side wall of the base 102. The air flow passes through the fan housing 150 and into the air duct 156, from which it is emitted through the apertures 158. The air flow passes over the water located in the water reservoir 132, causing the airborne water droplets to become entrained within the air flow generated by the fan 148. The—now moist—air flow passes upwardly through the spout 112 and is emitted from the mist outlet 108 in the form of a mist or fog. This mist is drawn through the central opening 24 of the nozzle 14 as part of the secondary air flow generated by the emission of the primary air flow from the mouth 26 of the nozzle 14. Consequently, the mist is conveyed away from the humidifier 100 within the air current generated by the fan assembly 10, thereby enabling a humid air current to be experienced rapidly at a distance of several meters from the humidifier 100. Through oscillation of the main body 42 of the stand 12, and thus oscillation of the nozzle 14, relative to the humidifier 100, this humid air current can be swept over an arc in the range from 60 to 120°, preferably around 90°, to increase rapidly the dispersion of the humid air into the external environment.

Provided that the button 160b has not been depressed, the moist air flow is emitted from the humidifier 100 until the relative humidity of the air flow entering the humidifier 100, as detected by the humidity sensor 166, is 1% at 20° C. higher than the relative humidity level selected by the user using the dial 162. The emission of a moist air flow from the humidifier 100 is then terminated by the drive circuit 146, through terminating the supply of actuating signals to the transducers 140a, 140b. Optionally, the motor 149 may also be stopped so that no air flow is emitted from the humidifier 100 but when the humidity sensor 166 is located in close proximity to the motor 149, as in this example, it is preferred that the motor 149 is continually operated to avoid undesirable temperature fluctuation in the local environment of the humidity sensor 166. When the humidity sensor 166 is located outside the humidifier 100, for example, the motor 149 may also be stopped when the relative humidity of the air of the environment local to the humidity sensor 166 is 1% at 20° C. higher than the relative humidity level selected by the user.

As a result of the termination of the emission of a moist air flow from the humidifier 100, the relative humidity detected by the humidity sensor 166 will begin to fall. Once the relative humidity of the air of the environment local to the humidity sensor 166 has fallen to 1% at 20° C. below the relative humidity level selected by the user, the drive circuit 146 outputs actuating signals to a selected one of the transducers, for example transducer 140a, to re-start the emission of a moist air flow from the humidifier 100. As before, the moist air flow is emitted from the humidifier 100 until the relative humidity detected by the humidity sensor 166 is 1% at 20° C. higher than the relative humidity level selected by the user, at which point the actuation of the transducer 140a is terminated. Once the relative humidity of the air of the environment local to the humidity sensor 166 has again fallen to 1% at 20° C. below the relative humidity level selected by the user, the drive circuit 146 outputs actuating signals to the other transducer, for example transducer 140b, to re-start the emission of a moist air flow from the humidifier 100. Again, the moist air flow is emitted from the humidifier 100 until the relative humidity detected by the humidity sensor 166 is 1% at 20° C. higher than the relative humidity level selected by the user, at which point the actuation of the transducer 140b is terminated.

This sequence of alternate actuation of the transducers 140a, 140b to maintain the detected humidity level around the level selected by the user continues until the button 160a is depressed to switch off the humidifier 100 or until a signal is received from the level sensor 136 indicating that the level of water within the water reservoir 132 has fallen by the minimum level.

Figure 11:
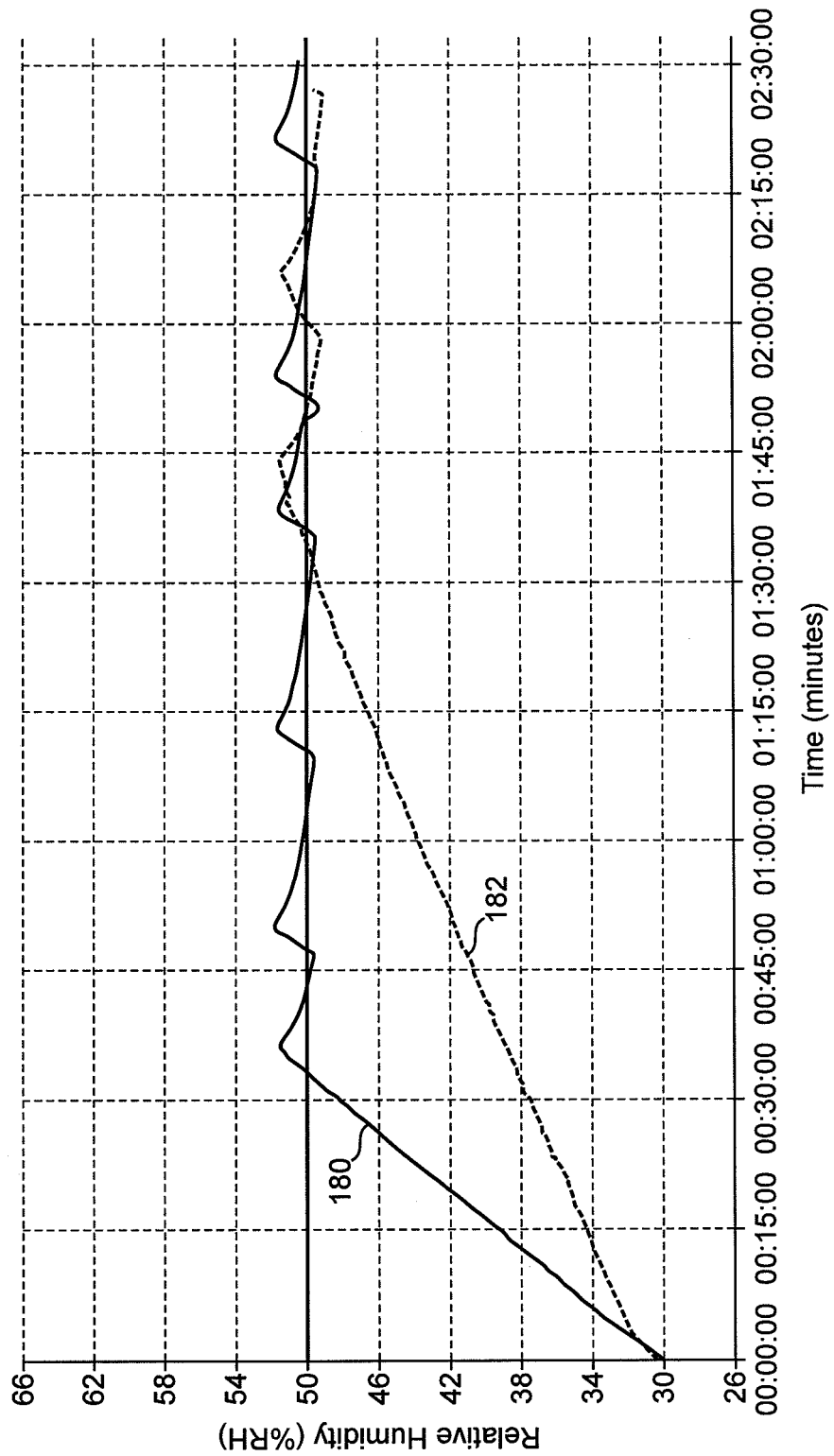

The relative humidity detected by the humidity sensor 166 is thus maintained around the level selected by the user using the dial 162 by the subsequent actuation of a reduced number $n_2$ of transducers (one) in comparison to the number $n_1$ of transducers (two) used to initially increase the relative humidity in the external environment to the selected level. The advantage associated with the actuation of a greater number of transducers to initially raise the relative humidity in the external environment to the selected level is indicated in FIG. 11. FIG. 11 is a graph illustrating the variation of the detected relative humidity with time for two operations of the humidifying apparatus. In the first operation both transducers 140*a*, 140*b* are actuated initially to raise the relative humidity to 50% at 20° C. In the second operation, only transducer 140*a* is actuated to initially raise the relative humidity to 50% at 20° C. The variation of the detected relative humidity with time for the first operation is indicated by line 180 in FIG. 11, whereas the variation of the detected relative humidity with time for the second operation is indicated by line 182 in FIG. 11. As can be seen from FIG. 11, the time taken for the detected relative humidity to increase from a base level of around 30% at 20° C. to the preset level was considerably shorter when both transducers 140*a*, 140*b* were used to raise the relative humidity to 50% at 20° C.

As an alternative to actuating a reduced number $n_2$ of transducers to maintain the detected relative humidity around the preset level, the same number $n_1$ of transducers (two) used to initially increase the relative humidity in the external environment to the selected level may also be used to maintain the detected relative humidity around the preset level. In this case, the duration of the actuation of the $n_1$ transducers from when the detected relative humidity of the air of the environment local to the humidity sensor 166 has again fallen to 1% at 20° C. below the relative humidity level to when the relative humidity detected by the humidity sensor 166 is 1% at 20° C. higher than the relative humidity level selected by the user is shorter than when the reduced number $n_2$ of transducers to maintain the detected relative humidity around the preset level. With reference again to FIG. 11, in the first operation both transducers 140*a*, 140*b* are actuated to maintain the detected relative humidity around the preset level, whereas in the second operation only a single actuator is used to maintain the detected relative humidity around the preset level. Similar to when a reduced number $n_2$ of transducers is used to maintain the detected relative humidity around the preset level, this can enable the life time of the transducers 140*a*, 140*b* to be prolonged.

The invention claimed is:

1. Humidifying apparatus comprising a humidifier for emitting moist air into an external environment, a fan assembly for generating an air current within the external environment for conveying the emitted moist air away from the humidifier, the fan assembly comprising a device for creating an air flow, and a nozzle comprising an interior passage for receiving the air flow and a mouth for emitting the air flow, the nozzle extending about and defining an opening for receiving both the moist air emitted from the humidifier and the air flow emitted from the mouth, and wherein air from outside the nozzle is drawn through the opening by the air flow emitted from the mouth.

2. The humidifying apparatus of claim 1, wherein the fan assembly is a bladeless fan assembly.

3. The humidifying apparatus of claim 1, wherein the interior passage is shaped to divide the received air flow into two air streams each flowing along a respective side of the opening.

4. The humidifying apparatus of claim 1, wherein the interior passage is substantially annular.

5. The humidifying apparatus of claim 1, wherein the mouth extends about the opening.

6. The humidifying apparatus of claim 1, wherein the nozzle comprises an inner casing section and an outer casing section which together define the interior passage and the mouth.

7. The humidifying apparatus of claim 6, wherein the mouth comprises an outlet located between an external surface of the inner casing section of the nozzle and an internal surface of the outer casing section of the nozzle.

8. The humidifying apparatus of claim 7, wherein the outlet is in the form of a slot extending at least partially about the opening.

9. The humidifying apparatus of claim 7, wherein the outlet has a width in the range from 0.5 to 5 mm.

10. The humidifying apparatus of claim 1, wherein the nozzle comprises a surface located adjacent the mouth and over which the mouth is arranged to direct the air flow.

11. The humidifying apparatus of claim 10, wherein the surface is a Coanda surface.

12. The humidifying apparatus of claim 11, wherein the Coanda surface extends about the opening.

13. The humidifying apparatus of claim 11, wherein the humidifier comprises a mist outlet located directly behind part of the Coanda surface of the nozzle.

14. The humidifying apparatus of claim 1, wherein the fan assembly is integral with the humidifier.

15. Humidifying apparatus comprising a humidifier having a mist outlet for emitting moist air into an external environment, a fan assembly for generating an air current within the external environment for conveying the emitted moist air away from the humidifier, the fan assembly comprising a device for creating an air flow and a nozzle comprising an interior passage for receiving the air flow and a mouth for emitting the air flow, the nozzle extending about and defining an opening through which air from outside the nozzle is drawn by the air flow emitted from the mouth, and wherein the humid air emitted from the mist outlet becomes entrained within the air flow drawn through the opening.

16. The humidifying apparatus of claim 15, wherein the fan assembly is a bladeless fan assembly.

17. The humidifying apparatus of claim 15, wherein the interior passage is shaped to divide the received air flow into two air streams each flowing along a respective side of the opening.

18. The humidifying apparatus of claim 15, wherein the interior passage is substantially annular.

19. The humidifying apparatus of claim 15, wherein the mouth extends about the opening.

20. The humidifying apparatus of claim 15, wherein the nozzle comprises an inner casing section and an outer casing section which together define the interior passage and the mouth.

21. The humidifying apparatus of claim 20, wherein the mouth comprises an outlet located between an external surface of the inner casing section of the nozzle and an internal surface of the outer casing section of the nozzle.

22. The humidifying apparatus of claim 21, wherein the outlet is in the form of a slot extending at least partially about the opening.

23. The humidifying apparatus of claim 21, wherein the outlet has a width in the range from 0.5 to 5 mm.

24. The humidifying apparatus of claim 15, wherein the nozzle comprises a surface located adjacent the mouth and over which the mouth is arranged to direct the air flow.

25. The humidifying apparatus of claim 24, wherein the surface is a Coanda surface.

26. The humidifying apparatus of claim 25, wherein the Coanda surface extends about the opening.

27. The humidifying apparatus of claim 25, wherein the mist outlet is located directly behind part of the Coanda surface of the nozzle.

28. The humidifying apparatus of claim 15, wherein the fan assembly is integral with the humidifier.

\* \* \* \* \*